No. 870,016. PATENTED NOV. 5, 1907.
M. J. CORCORAN.
WHIFFLETREE HOOK.
APPLICATION FILED MAR. 18, 1907.
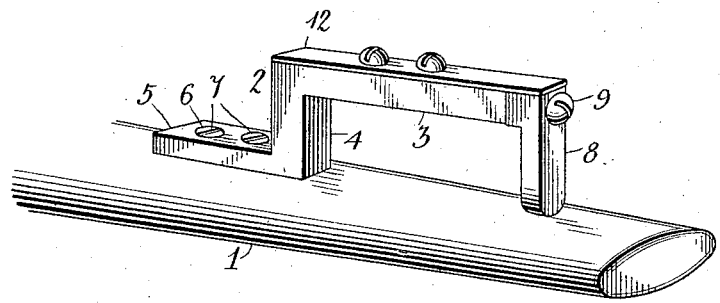
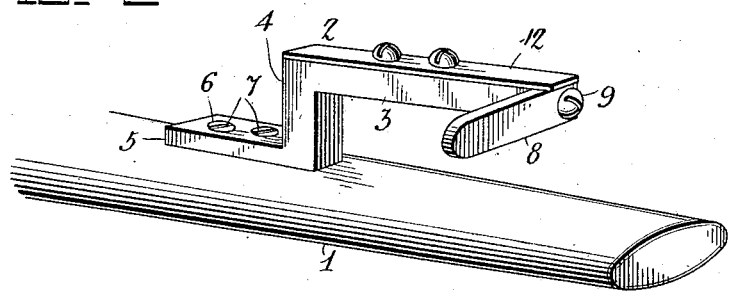
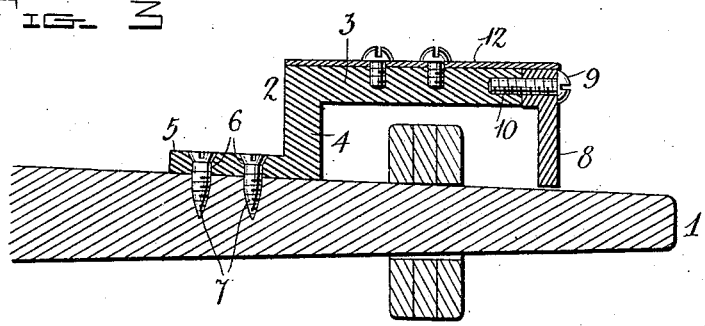
Witnesses
Inventor
M. J. Corcoran
by
Attorneys

UNITED STATES PATENT OFFICE.

MICHAEL J. CORCORAN, OF YORK, PENNSYLVANIA.

WHIFFLETREE-HOOK.

No. 870,016.  Specification of Letters Patent.  Patented Nov. 5, 1907.

Application filed March 18, 1907. Serial No. 362,992.

*To all whom it may concern:*

Be it known that I, MICHAEL J. CORCORAN, a citizen of the United States, residing at York, in the county of York and State of Pennsylvania, have invented certain new and useful Improvements in Whiffletree-Hooks; and I do declare the following to be a full, clear, and exact description of the invention, such as will enable others skilled in the art to which it appertains to make and use the same.

This invention relates to improvements in whiffle tree hooks.

The object of the invention is to provide a hook of this character by means of which a trace may be readily engaged with and secured to a whiffle tree and which may be quickly and easily operated to release a trace therefrom.

With the foregoing and other objects in view which will appear as the nature of the invention is better understood, the invention consists in certain novel features of construction, combination and arrangement of parts, as will be hereinafter fully described and claimed.

In the accompanying drawings, Figure 1 is a perspective view of one end of a whiffle tree showing the hook applied thereto and in closed position to secure a trace thereon; Fig. 2 is a similar view showing the hook open to permit the trace to be disengaged from the end of the whiffle tree; Fig. 3 is a longitudinal sectional view of the end of the whiffle tree and hook showing a sectional view of a trace engaged therewith.

Referring more particularly to the drawings, 1 denotes the end of a whiffle tree, to the upper side of which is secured my improved hooks 2, which consists of a longitudinally-disposed bar 3 on the inner end of which is an integral downwardly-projecting right-angularly formed lug 4 on the lower end of which is formed a right-angularly longitudinally-extending securing plate or bar 5, said bar 5 projecting in the opposite direction from the upper bar 3.

In the plate or fastening bar 5 is formed two or more screw or bolt holes 6 through which and into the whiffle tree are adapted to be passed fastening screws or bolts 7 by means of which the hook is secured to the whiffle tree.

On the outer end of the bar 3 is arranged a retaining arm 8, said arm being provided on its upper end with an enlarged portion which forms a head and is adapted to engage the outer end of the bar 3, as shown.

The arm 8 is pivotally connected to the end of the bar 3 by means of the pivot bolt or screw 9 which is passed through a hole in the head of the arm and is adapted to be screwed into engagement with a threaded socket or recess 10 formed in the end of the bar 3. By thus pivotally connecting the arm 8 with the end of the bar 3, said arm may be turned laterally in either direction to permit the end of a trace to be engaged with or disengaged from the end of the whiffle tree. After the end of the trace has been engaged with the end of the whiffle tree and slipped beneath the bar 3, the arm 8 is swung downwardly to an operative position thereby closing the end of the space between the bar 3 and the upper side of the whiffle tree and securely holding the trace from disengagement ti.erefrom.

In order that the arm 8 may be held in an operative or inoperative position, I provide a flat spring 12 which is secured to the upper side of the bar 3 by screws or other fastening device. The outer end of the spring 12 projects beyond the end of the bar 3 and is adapted to engage the upper square surface of the head of the arm 8 when the latter is in an operative position and to engage one side or the other of the head of the arm when the latter is turned upwardly in either direction to an inoperative position, as shown in Fig. 2 of the drawing. The engagement of the spring with the head of the arm 8 will hold the same against casual movement when turned to either an operative or inoperative position and at the same time will permit the arm to be readily turned from one position to the other.

A whiffle tree hook constructed as herein shown and described will be simple, strong, durable and inexpensive in construction, efficient and reliable in operation and well adapted for the purposes for which it is designed.

From the foregoing description, taken in connection with the accompanying drawings, the construction and operation of the invention will be readily understood without requiring a more extended explanation.

Various changes in the form, proportion and the minor details of construction may be resorted to without departing from the spirit or sacrificing any of the advantages of the invention, as defined by the appended claims.

Having thus described my invention, what I claim as new is,—

1. A whiffletree-hook comprising a right-angularly shaped bar, means to secure the same to a whiffletree, a trace retaining arm pivotally mounted on the outer end of said bar, a flat spring, and means on said arm adapted to be engaged by said spring to hold the arm in an open or closed position, substantially as described.

2. A whiffletree-hook comprising a right-angularly shaped bar, means to secure the same to a whiffle-tree, a trace retaining arm pivotally mounted on the outer end of said bar, a spring, and a squared head on the upper end of said arm, the right-angularly disposed sides of which are adapted to be engaged by said spring to hold said arm in an operative and inoperative position, substantially as described.

3. A whiffle tree hook comprising a longitudinally-disposed bar having at one end a right-angularly downwardly-projecting lug, an integrally formed fastening plate on the lower end of said lug, said plate projecting in the opposite direction to said bar, means to secure said plate to a whiffle tree, a trace retaining arm arranged on the outer end of said bar, a pivot screw passed through the upper end of said arm and adapted to be screwed into engagement with a threaded socket in the end of said bar whereby said arm is connected to the bar to turn laterally thereon, and a flat spring secured to the upper sides of the bar and projecting beyond the ends of the same to engage said arm and hold the same in an open or closed position, substantially as described.

In testimony whereof I have hereunto set my hand in presence of two subscribing witnesses.

MICHAEL J. CORCORAN.

Witnesses:
GEORGE CASY,
BENJAMIN STRICKLER.